S. R. BERGMAN.
ALTERNATING CURRENT MOTOR.
APPLICATION FILED OCT. 4, 1913.

1,174,654.

Patented Mar. 7, 1916.

WITNESSES:
J. Earl Ryan
J. Ellis Glenn

INVENTOR:
SVEN R. BERGMAN,
BY
HIS ATTORNEY.

UNITED STATES PATENT OFFICE.

SVEN R. BERGMAN, OF LYNN, MASSACHUSETTS, ASSIGNOR TO GENERAL ELECTRIC COMPANY, A CORPORATION OF NEW YORK.

ALTERNATING-CURRENT MOTOR.

1,174,654.      Specification of Letters Patent.      Patented Mar. 7, 1916.

Application filed October 4, 1913. Serial No. 793,309.

*To all whom it may concern:*

Be it known that I, SVEN R. BERGMAN, a subject of the King of Sweden, residing at Lynn, county of Essex, State of Massachusetts, have invented certain new and useful Improvements in Alternating-Current Motors, of which the following is a specification.

My invention relates to alternating current motors.

More particularly my invention relates to alternating current motors of that type in which the working currents of the motor are induced in a secondary winding or windings by a current flowing in a primary or inducing winding connected to the supply line. Induction and repulsion motors are familiar examples of this particular type of motor.

The object of my invention is to provide a motor of the type above mentioned with novel and simple means for automatically controlling in response to the speed of the motor the quantity of current flowing in the induced or secondary winding.

Another object of my invention is to provide a novel speed-responsive means for varying the effective resistance of the induced or secondary winding of such a motor.

A further object of my invention is to provide a novel means for varying the ratio of current distribution between two independent or equivalently independent secondary windings.

More specifically a further object of my invention is to provide a novel construction of motor having two secondary windings of different characteristics together with novel means for varying with the speed of the motor the ratio of current distribution between the two secondary windings.

The features of my invention, which I believe to be patentably novel, are definitely indicated in the claims appended hereto.

The application of my invention in an alternating current motor and the mode of operation thereof will be understood from the following description taken in connection with the accompanying drawings, in which—

Figure 1:
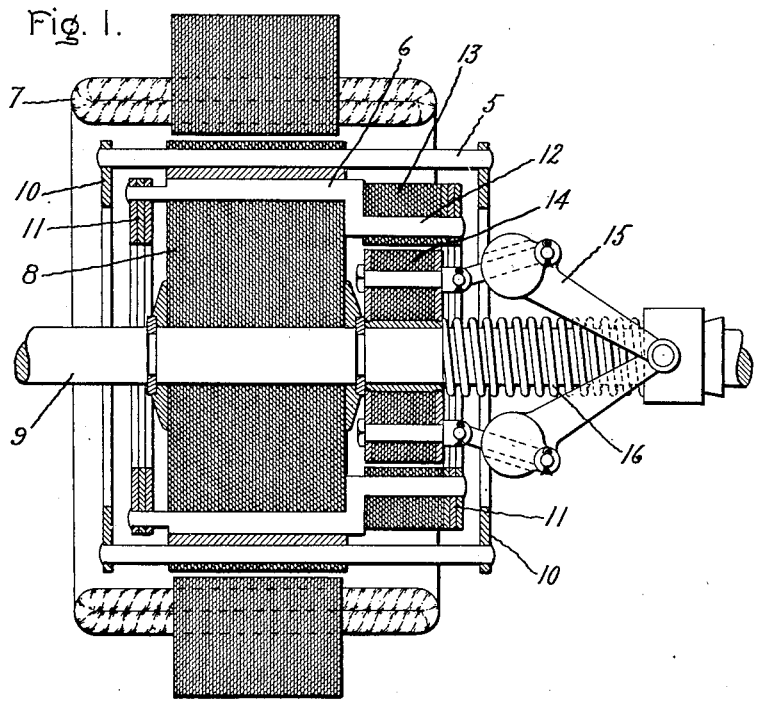
Figure 2:
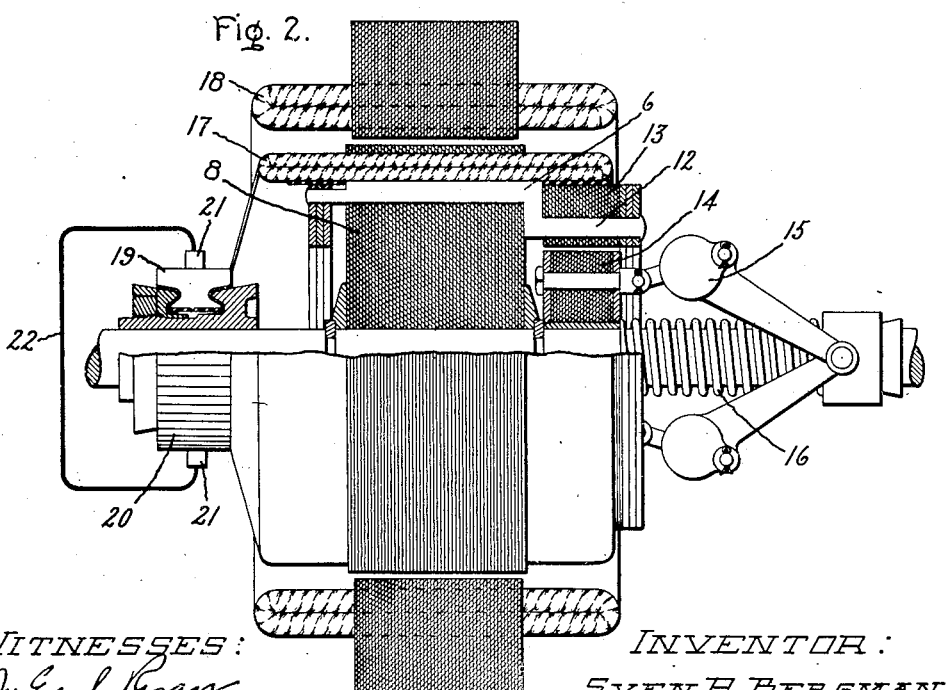

Figure 1 is a diagrammatic sectional view of an induction motor embodying the features of my invention, and Fig. 2 is a similar sectional view of a motor having a commuted secondary winding of the repulsion motor type and a secondary winding of the induction motor type in which the features of my invention have been incorporated.

The secondary winding of an induction motor should possess a relatively high resistance in order to produce a satisfactory starting and accelerating torque but should possess a relatively low resistance for satisfactory normal operating characteristics. Numerous constructions of secondary windings have heretofore been suggested and devised for imparting to the winding a relatively high effective resistance during the starting and accelerating speeds of the motor and a relatively low effective resistance when the motor reaches substantially normal full load speed. My invention contemplates improved and novel means for automatically varying with the speed of the motor the effective resistance of the conductors of a secondary winding of the induction motor type. In carrying out my invention I provide means responsive to the speed of the motor for automatically varying the reactance of a portion of each conductor of the secondary winding. The novel features of my invention and their application to different types of motors will be best understood from a consideration of the accompanying drawings.

In Fig. 1 of the drawings I have illustrated my invention embodied in an induction motor having two secondary windings of the squirrel cage type. The working currents of the motor are induced in the secondary windings 5 and 6 of the squirrel cage type by a polyphase primary or inducing winding 7. The inducing winding 7 is preferably located in the usual manner in the stationary member of the motor. The secondary windings 5 and 6 are carried by a core of laminated magnetic material 8 rigidly secured to a rotatably mounted shaft 9. The conductor bars of the winding 5 have relatively high ohmic resistance while the conductor bars of the winding 6 have relatively low ohmic resistance. I shall hereinafter refer to the winding 5 as the high resistance winding and the winding 6 as the low resistance winding. The conductor bars of the squirrel cage windings 5 and 6 are short circuited in the usual manner by end rings 10 and 11 respectively.

The conductor bars of the low resistance winding 6 extend at one end beyond the core of magnetic material 8. These extensions 12 of the low resistance conductor bars project through a ring or annulus 13 of laminated magnetic material. The ring 13 is rigidly secured to the extensions 12 of the conductor bars and to the magnetic core 8 so that it rotates therewith. A circular core 14 of laminated magnetic material is slidably mounted upon the shaft 9 and within the magnetic ring 13 and serves to magnetically close the ring. The core 14 rotates with the shaft 9 but is capable of longitudinal movement along the shaft. A speed-responsive device 15 of the centrifugal governor type is operatively secured to the shaft of the motor and to the magnetic core 14. A coil spring 16 surrounds the shaft 9 and normally maintains the magnetic core 14 symmetrically positioned within the magnetic ring 13.

The magnetic ring 13 and the magnetic core 14 coöperate to establish a magnetic circuit around the extensions 12 of the low resistance conductor bars. The reluctance of this magnetic circuit is a minimum when the magnetic core 14 is symmetrically located within the magnetic ring 13. As this symmetry is disturbed by withdrawing the core 14, the reluctance of the magnetic circuit around the extensions 12 increases until the core reaches a position where it is in effect magnetically separated from the ring 13. The extensions 12 will thus be surrounded by a large magnetic flux when the core 14 is symmetrically located within the ring 12, and will be surrounded by a substantially negligible magnetic flux when the core has been withdrawn from magnetic coöperation with the ring. The ring and core thus coöperate to form a reactive core about portions of the conductor bars of the low resistance winding 6, whereby the reactance of these portions can be varied by adjusting the relative positions of the two coöperating members of the reactive core.

During the starting and accelerating speeds of the motor the magnetic core 14 will occupy the position shown in Fig. 1. Under these conditions the self-induction of the extensions 12 of the conductor bars of the low resistance winding will be great and thus the reactance of these extensions will be relatively high. Since the frequency of the induced or secondary current is also relatively high at this stage of the operation of the motor the effective reactance of the extensions 12 will be considerable and little current will flow through the winding 6 due to its high effective resistance. The induced secondary current will thus be forced to flow in the high resistance winding 5 whereby a satisfactory starting torque of the motor is insured. As the motor accelerates the centrifugal speed governor gradually overcomes the tension of the coil spring 16 and pulls the magnetic core 14 out of and away from the magnetic ring 13. The self-induction of the extensions 12 is thereby diminished and the reactance also decreases. Further, the frequency of the secondary current becomes smaller as the motor speeds up and thus the self-induction is less effective in the reactance factor. The effective resistance of the winding 6, therefore, gradually diminishes as the speed of the motor increases until the motor reaches substantially full load speed when the magnetic reactive core 14 has been withdrawn entirely from magnetic coöperation with the ring 13, and thus the winding 6 functions as an ordinary squirrel cage winding of low resistance. It will thus be evident that according to my invention the ratio of current distribution between the two secondary windings 5 and 6 is automatically varied in accordance with the speed of the motor.

In Fig. 2 of the drawings I have illustrated a single phase motor having a primary or inducing single phase winding 18. This motor is provided with two secondary windings in which are induced the working currents of the motor. One of these windings 17 is a commuted winding and the other is an induction motor winding of the squirrel cage type of the same construction as the low resistance winding 6 shown in Fig. 1. The winding 17 is a commuted winding of the direct current type generally employed in repulsion motors and is connected as usual to the segments 19 of a commutator 20. Brushes 21, having a short circuiting connection 22, bear upon the commutator 20. I preferably assemble the conductors of the two secondary windings in the same slots of the magnetic core 8, the conductor bars of the squirrel cage winding being located in the bottom of the slots. During the starting and low speed operating conditions of the motor the reactance of the extensions 12 is sufficiently high to reduce to a very small quantity the flow of induced or secondary current in the squirrel cage induction motor winding 6. Accordingly, under these operating conditions the major portion of the secondary current will flow in the commuted winding and the motor will, therefore, start as an ordinary repulsion motor with the large starting torque characteristic of this type of motor. As the speed of the motor increases the magnetic reactive core 14 is withdrawn from within the magnetic reactive ring 13 and the reactance of the extensions 12 thereby become small. More and more current will thus be permitted to flow in the induction motor winding 6 until at normal full load speed the secondary current will divide substantially equally between the commuted winding and the induction motor winding.

The construction illustrated in Fig. 2 of the drawings provides a repulsion-induction motor possessing peculiarly satisfactory characteristics. This motor starts as an ordinary repulsion motor, the induction motor winding, due to its high reactance, remaining substantially inactive during the starting speeds. As the motor accelerates the secondary current is automatically shifted from the commuted winding to the squirrel cage induction motor winding due to the mechanical displacement of the magnetic reactive core 14. Under full load operating conditions the motor behaves substantially as an induction motor. It will be seen that the change from operation with repulsion motor characteristics to operation with induction motor characteristics is automatically effected without swinging devices of any kind.

I have herein described the best and preferred embodiments of my invention now known to me. It will be evident to those skilled in the art, however, that my invention is capable of bearing embodied in numerous constructions differing in form or detail from those heretofore described. I do not, therefore, wish to be limited to the particular types of motors or details of construction herein employed to explain my invention. I, accordingly, seek in the appended claims to cover all modifications embodying the features of my invention and within its spirit and scope.

What I claim as new and desire to secure by Letters Patent of the United States, is—

1. An alternating current motor comprising an inducing winding, a secondary winding having conductor bars short circuited by end rings, magnetic material movably mounted in proximity to said secondary winding and adapted to vary by its movement the reactance of the conductor bars of said secondary winding, and means responsive to the speed of the motor operatively connected to said magnetic material and adapted to move the magnetic material whereby the effective resistance of said secondary winding is automatically varied.

2. An alternating current motor comprising an inducing winding, a secondary member having a core of magnetic material, a short circuited winding carried by said core and having conductor bars extending on one side beyond the core, magnetic material movably mounted in proximity to the extending portions of said conductor bars and adapted to vary by its movement the reactance of said portions of said bars, and speed-responsive means operatively connected to said magnetic material and adapted to move the magnetic material whereby the effective resistance of said conductor bars is automatically varied.

3. An alternating current motor comprising an inducing winding, a secondary member having a core of magnetic material, a short circuited winding carried by said core and having conductor bars extending on one side beyond the core, a ring of magnetic material through which the extending portions of said conductor bars project, a second core of magnetic material coaxial with said first mentioned core and mounted for longitudinal movement within said ring of magnetic material, and speed-responsive means operatively connected to said second magnetic core.

4. An alternating current motor comprising an inducing winding, a secondary member having a core of magnetic material rigidly secured to a rotatably mounted shaft, a short circuited winding carried by said core and having conductor bars extending on one side beyond the core, a ring of magnetic material through which the extending portions of said conductor bars project, said ring of magnetic material being rigidly secured to said conductor bars and to said core of magnetic material to rotate therewith, a second core of magnetic material mounted for longitudinal movement upon said shaft and within said ring of magnetic material, and speed-responsive means operatively connecting said shaft and said second core of magnetic material whereby the relative positions of said second core of magnetic material and said ring of magnetic material are automatically varied with the speed of the motor.

5. An alternating current motor comprising an inducing winding, a secondary member having a core of magnetic material, a secondary winding carried by said core, a short circuited secondary winding also carried by said core and having conductor bars extending on one side beyond said core, magnetic material movably mounted in proximity to the extending portions of said conductor bars, and speed responsive means operatively connected to said magnetic material and adapted to move the magnetic material for varying the effective resistance of the conductor bars of said short circuited secondary winding whereby the ratio of current distribution between said secondary windings is automatically varied.

6. An alternating current motor comprising an inducing winding, a secondary member having a core of magnetic material, a secondary winding carried by said core, a short circuited secondary winding also carried by said core and having conductor bars of relatively low ohmic resistance, magnetic material movably mounted in proximity to said short circuited secondary winding and adapted by its movement to vary the reactance of the conductor bars of said short circuited winding, and speed-responsive means operatively connected to said magnetic material and adapted to move the magnetic material whereby the effective resistance of the conductor bars of said short circuited secondary winding is automatically varied and the ratio of current distribution between the two secondary windings is also automatically varied.

7. An alternating current motor comprising an inducing winding, a secondary member having a core of magnetic material, a secondary winding carried by said core, a short circuited secondary winding also carried by said core and having conductor bars extending on one side beyond the core, magnetic material movably mounted in proximity to the extending portions of said conductor bars and adapted to vary by its movement the reactance of said portions of said conductor bars, and speed-responsive means operatively connected to said magnetic material and adapted to move the magnetic material whereby the effective resistance of said conductor bars is automatically varied and the ratio of current distribution between the two secondary windings is also automatically varied.

8. An alternating current motor comprising an inducing winding, a secondary member having a core of magnetic material, a commuted secondary winding carried by said core, short circuiting brushes bearing on the commutator of said commuted winding, a short circuited secondary winding also carried by said core and having conductor bars of relatively low ohmic resistance, and speed-responsive means for varying the effective resistance of the conductor bars of the short circuited secondary winding whereby the ratio of current distribution between the two secondary windings is automatically varied.

9. An alternating current motor comprising an inducing winding, a secondary member having a core of magnetic material, a commuted secondary winding carried by said core, short circuiting brushes bearing on the commutator of said commuted winding, a short circuited secondary winding also carried by said core and having conductor bars extending on one side beyond the core, magnetic material movably mounted in proximity to the extending portions of said conductor bars and adapted to vary by its movement the reactance of said portions of said conductor bars, and speed-responsive means operatively connected to said magnetic material and adapted to move the magnetic material whereby the effective resistance of said conductor bars is automatically varied and the ratio of current distribution between the two secondary windings is also automatically varied.

10. An alternating current motor comprising an inducing winding, a secondary member having a core of magnetic material, a commuted secondary winding carried by said core, short circuiting brushes bearing on the commutator of said commuted winding, a short circuited secondary winding also carried by said core and having conductor bars extending on one side beyond the core, a ring of magnetic material through which the extending portions of said conductor bars project, a second core of magnetic material coaxial with said first mentioned core and mounted for longitudinal movement within said ring of magnetic material, and speed-responsive means operatively connected to said second magnetic core.

11. An alternating current motor comprising an inducing winding, a secondary member having a core of magnetic material rigidly secured to a rotatably mounted shaft, a commuted secondary winding carried by said core, short circuiting brushes bearing on the commutator of said commuted winding, a short circuited secondary winding also carried by said core and having conductor bars extending on one side beyond the core, a ring of magnetic material through which the extending portions of said conductor bars project, said ring of magnetic material being rigidly secured to said conductor bars and to said core of magnetic material to rotate therewith, a second core of magnetic material mounted for longitudinal movement upon said shaft and within said ring of magnetic material, and speed-responsive means operatively connecting said shaft and said second core of magnetic material whereby the relative positions of said second core of magnetic material and said ring of magnetic material are automatically varied with the speed of the motor.

In witness whereof, I have hereunto set my hand this twenty eighth day of September, 1913.

SVEN R. BERGMAN.

Witnesses:
JOHN A. McMANUS, Jr.,
GEORGE E. STEVENS.